United States Patent [19]

Murakami

[11] Patent Number: 5,457,723

[45] Date of Patent: Oct. 10, 1995

[54] BARREL SHIFTER HAVING CMOS STRUCTURE INTEGRATED ON MOS INTEGRATED CIRCUITS

[75] Inventor: Hiroshi Murakami, Itami, Japan

[73] Assignees: Mitsubishi Denki Kabushiki Kaisha; Mitsubishi Electric Engineering Company Limited, both of Tokyo, Japan

[21] Appl. No.: 268,984

[22] Filed: Jun. 30, 1994

[30] Foreign Application Priority Data

Jun. 30, 1993 [JP] Japan .................................. 5-160945

[51] Int. Cl.$^6$ .................................................. H03K 23/46
[52] U.S. Cl. ........................................ 377/64; 364/715.08
[58] Field of Search ...................... 377/64, 69; 364/715.08

[56] References Cited

U.S. PATENT DOCUMENTS

| | | | |
|---|---|---|---|
| 4,839,839 | 6/1989 | Tokumaru et al. | 364/715.08 |
| 4,962,511 | 10/1990 | Tokumaru | 364/715.08 |
| 5,099,445 | 3/1992 | Studor et al. | 364/715.08 |

Primary Examiner—Margaret Rose Wambach
Attorney, Agent, or Firm—Lowe, Price, LeBlanc & Becker

[57] ABSTRACT

In a barrel shifter comprising input data lines DI wired in the form of steps, output data lines DO wired laterally, and CMOS transfer gates arranged in a matrix in which the output data lines DO are connected with the input data lines DI shifted by the number of bits in accordance with the shift rate, either source or drain of P-type transfer gates P41 and P42 is made common and the source or drain of N-type transfer gates N40 and N41 is made common. The wiring of shift bit control lines S, #S for controlling transfer gates is designed to be straight by shifting transfer gates by 1 bit for P-type and N-type, the source or drain of the transfer gate being made common. With this design, the output capacity of transfer gates is reduced and the wiring length of transfer gate control signals is shortened.

2 Claims, 7 Drawing Sheets

| INPUT DATA DI(0:4) | | | | | NUMBER OF SHIFT BITS | SHIFT BIT CONTROL SIGNAL | | | | | | | | | | OUTPUT DATA DI(0:4) | | | | |
|---|---|---|---|---|---|---|---|---|---|---|---|---|---|---|---|---|---|---|---|---|
| | | | | | | FOR N-TYPE TRANSFER GATE | | | | | FOR P-TYPE TRANSFER GATE | | | | | | | | | | |
| 0 | 1 | 2 | 3 | 4 | SFT | S0 | S1 | S2 | S3 | S4 | #S0 | #S1 | #S2 | #S3 | #S4 | 0 | 1 | 2 | 3 | 4 |
| 1 | 0 | 0 | 0 | 0 | 0 | 1 | 0 | 0 | 0 | 0 | 0 | 1 | 1 | 1 | 1 | 1 | 0 | 0 | 0 | 0 |
| | | | | | 1 | 0 | 1 | 0 | 0 | 0 | 1 | 0 | 1 | 1 | 1 | 0 | 1 | 0 | 0 | 0 |
| | | | | | 2 | 0 | 0 | 1 | 0 | 0 | 1 | 1 | 0 | 1 | 1 | 0 | 0 | 1 | 0 | 0 |
| | | | | | 3 | 0 | 0 | 0 | 1 | 0 | 1 | 1 | 1 | 0 | 1 | 0 | 0 | 0 | 1 | 0 |
| | | | | | 4 | 0 | 0 | 0 | 0 | 1 | 1 | 1 | 1 | 1 | 0 | 0 | 0 | 0 | 0 | 1 |

BARREL SHIFTER HAVING CMOS STRUCTURE INTEGRATED ON MOS INTEGRATED CIRCUITS

BACKGROUND OF THE INVENTION

1. Field of the Invention

The present invention relates to a barrel shifter having a CMOS structure characterized by the layout pattern of the MOS integrated circuit.

2. Description of the Related Art

When the digital data is shift-operated in a logic circuit, basically it is possible to shift an optional number of bits by repetitively using the 1-bit shifter. However, for the hardware to execute such shifting at high speed, a barrel shifter is used, which can shift-operate an optional number of bits in one operation using a matrix type multiplexer.

For one example of the barrel shifter, description will be made on a barrel shifter in the 5×5 (n×n) bit configuration which is applied for the digital data of 5 (=n) bit data width.

Figure 1:
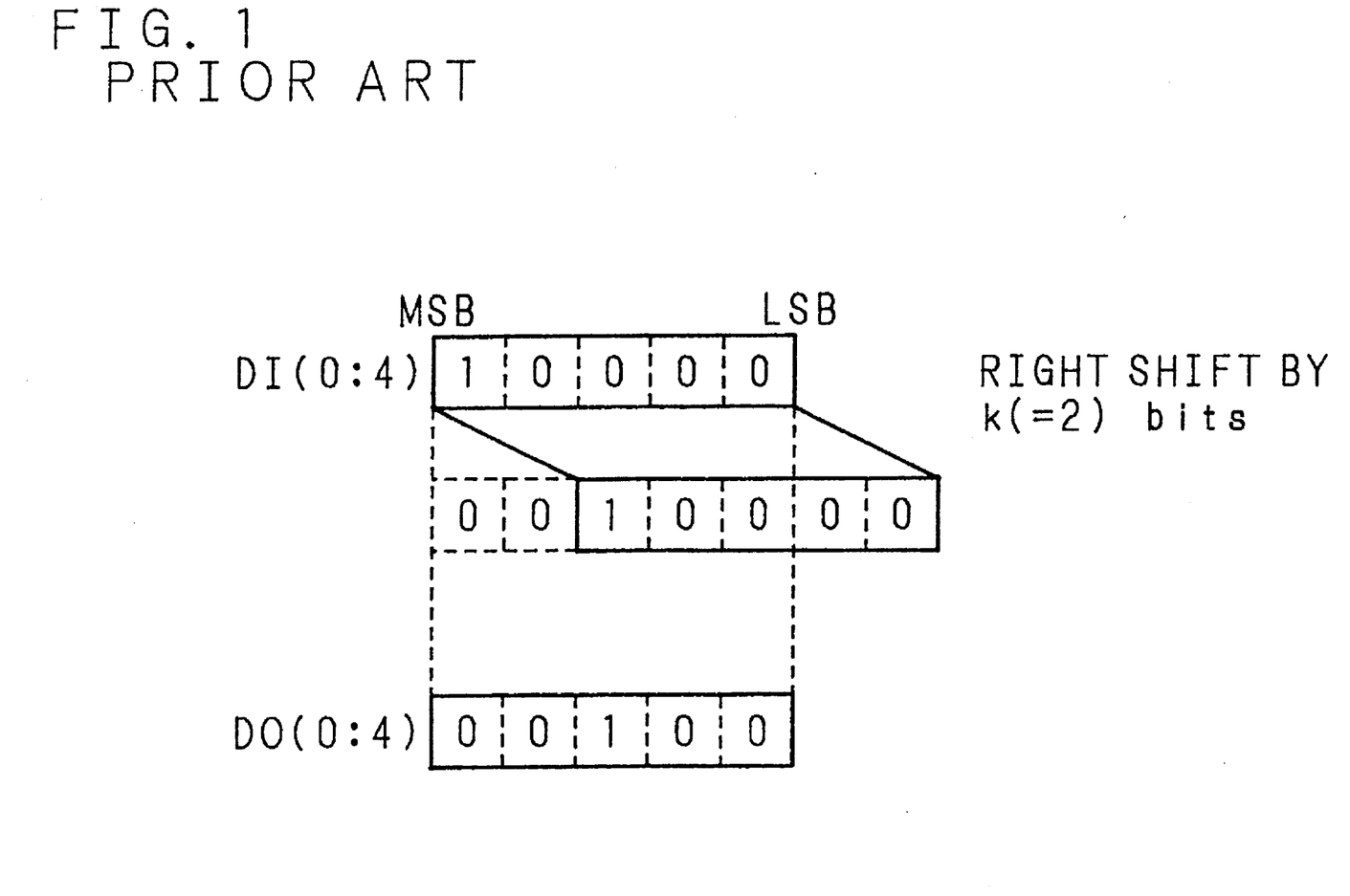
FIG. 1 is a schematic diagram to describe rightward shift operation by the barrel shifter.

FIG. 1 shows a schematic diagram showing the state of each bit when a 5-bit input data DI(0:4)="1000" is moved rightward by 2 bits by a barrel shifter of 5×5 bit configuration. In this example, output data DO(0:4)="00100" is obtained, wherein each bit of the input data DI(0:4)="1000" in which only MSB is "1" and other 4 bits are all "0" is moved rightward, that is, to the LSB side by 2 bits.

When a barrel shifter assembled into, for example, a one-chip microprocessor is realized as one example of MOS integrated circuits, conventionally NMOS structure comprising only N-type transfer gates has been generally employed. The main reason for this is that the N-type transfer gate has an advantage of high area efficiency because it needs only a small installation space when it is arranged on a semiconductor chip as compared with P-type transfer gate.

However, in the NMOS-structure circuit, it is necessary to add a pull-down circuit to load the initial data onto the input and output buses, and consequently, a wait time is required before the initial data is loaded for operation. In addition, in such a circuit in which initial data must be loaded, there is no problem when clock frequency is high, but when it is low, current leaks and data is not held correctly, generating a problem of limiting the operating frequency.

Figure 2:
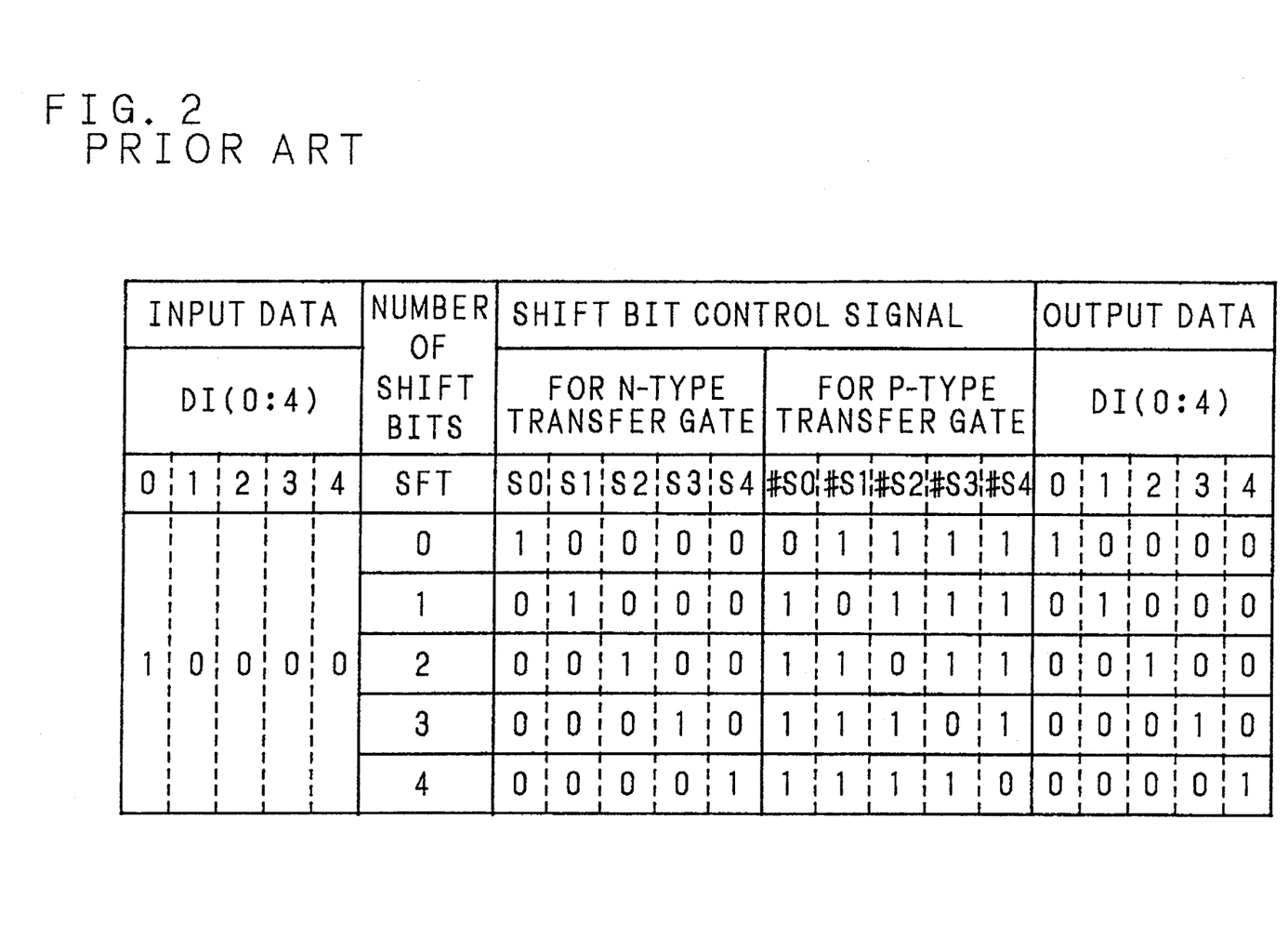
FIG. 2 is a truth table of input data, output data and number of shift bits to show operation of the barrel shifter.

FIG. 2 is a truth table when the 5×5 bit barrel shifter is realized by COMS configuration as described above, while FIG. 3 is a schematic diagram showing CMOS transfer gates of 5×5 bit configuration barrel shifter as hardware that realizes such logics as well as wiring condition of data lines and control signal lines.

SFT shown in FIG. 2 shows the number of shift bits, and in actual hardware, positive logic N type transfer gate control signal S(0:4) and negative logic P type transfer gate control signal #S(0:4) are generated by a decoder from the signal indicating the shift bit number SFT. And turning ON/OFF of each transfer gate in accordance with the levels of these transfer gate control signal S(0:4) and #S(0:4), the output data DO(0:4) is obtained from the input data DI(0:4) shifted by the number of bits indicated by the shift bit number SFT.

Figure 3:
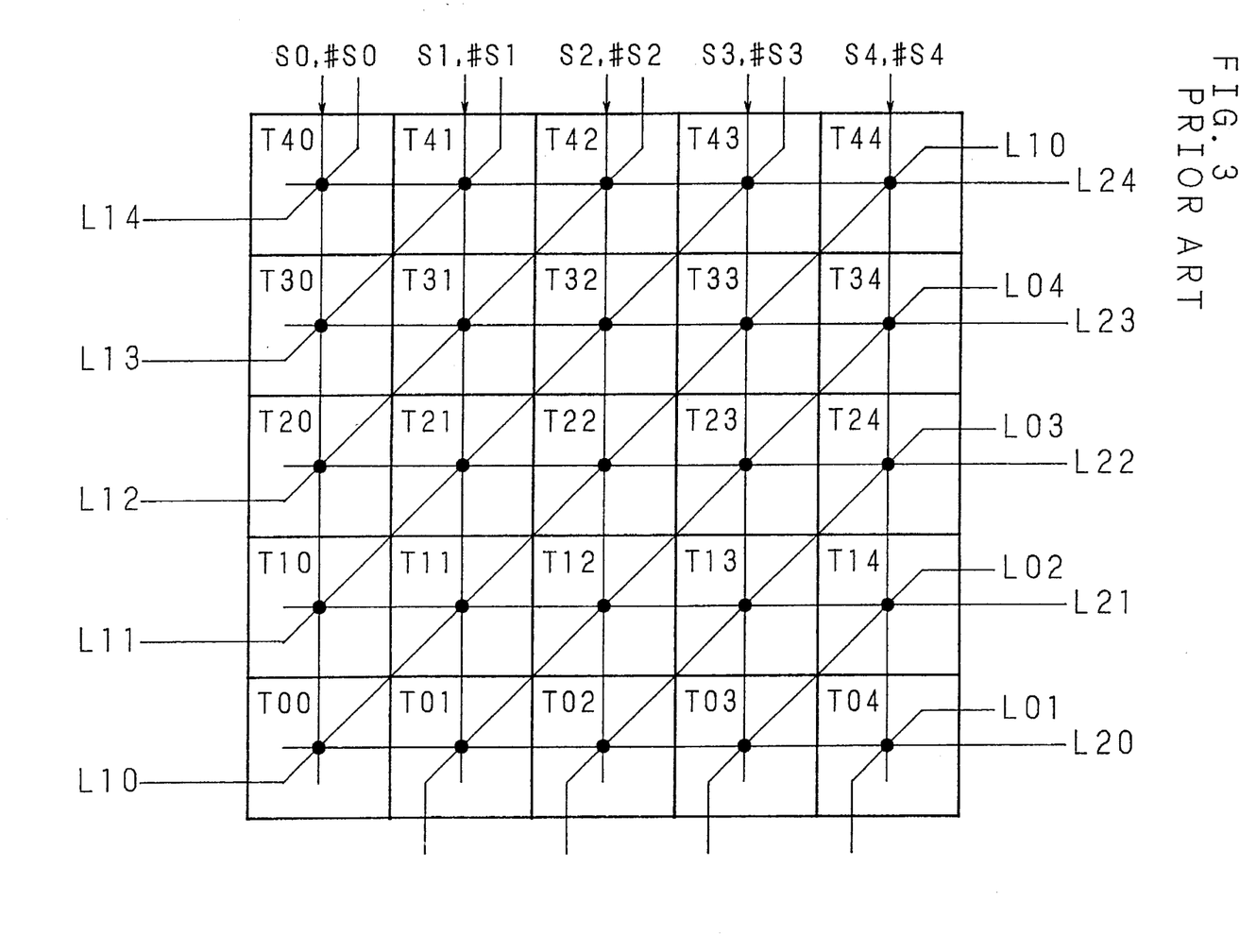
FIG. 3 is a schematic diagram to show CMOS transfer gates of 5×5 bit structure barrel shifter as a hardware to realize the logic shown in FIG. 2 and the wiring condition of data lines and control signal lines for the CMOS transfer gates.

In FIG. 3, reference symbols T00, T10 ... T44 show CMOS type transfer gates. In the barrel shifter of 5×5 bit configuration, 25 pieces of CMOS type transfer gate Tij (however, i=0 to 4, j=0 to 4) are, in actuality, arranged in the form of matrix. And to these CMOS type transfer gates Tij, the first group data lines L10, L11 to L14 (L01 to L04) and the second group data lines L20 to L24 as well as control signal lines S0 to S4, #S0 to #S4 are wired.

The first group data lines L10, L11 to L14 (L01 to L04) are wired as follows.

Data line L10 is connected to CMOS type transfer gates T00, T11, T22, T33 and T44 in the form of steps.

Data line L11 is connected to CMOS type transfer gates T10, T21, T32 and T43 in the form of steps, and data line L01 is connected to CMOS transfer gate T04 in the form of steps.

Data line L12 is connected to CMOS type transfer gates T20, T31 and T42 in the form of steps, and data line L02 is connected to CMOS transfer gates T03 and T14 in the form of steps.

Data line L13 is connected to CMOS type transfer gates T30 and T41 in the form of steps, and data line L03 is connected to CMOS transfer gates T02, T13 and T24 in the form of steps.

Data line L14 is connected to CMOS type transfer gate T40 in the form of steps, and data line L04 is connected to CMOS transfer gates T01, T12, T23 and T34 in the form of steps.

The second group data lines L20 to L24 are wired as follows. Data line L20 of the second group is connected to CMOS type transfer gates T00, T01, T02, T03 and T04 in a straight line, data line L21 to CMOS type transfer gates T10, T11, T12, T13 and T14 in a straight line, data line L22 to CMOS type transfer gates T20, T21, T22, T23 and T24 in a straight line, data line L23 to CMOS type transfer gates T30, T31, T32, T33 and T34 in a straight line, and data line L24 to CMOS type transfer gates T40, T41, T42, T43 and T44 in a straight line.

On the other hand, control signals S0, #S0 corresponding to the shift bit number 0 are connected to CMOS type transfer gates T00, T10, T20, T30 and T40 in a straight line, control signals S1, #S1 corresponding to shift bit number 1 to CMOS type transfer gates T01, T11, T21, T31 and T41 in a straight line, control signals S2, #S2 corresponding to shift bit number 2 to CMOS type transfer gates T02, T12, T22, T32 and T42 in a straight line, control signals S3, #S3 corresponding to shift bit number L3 to CMOS type transfer gates T03, T13, T23, T33 and T43 in a straight line, and control signals S4, #S4 corresponding to shift bit number 4 to CMOS type transfer gates T04, T14, T24, T34 and T44 in a straight line.

In this kind of barrel shifter, when the 5-bit input data DI(0:4) is shifted, for example, rightward by k (k=0 to 4) bits, control signals Sk, #Sk are made active (Sk="1", #Sk="0") and each bit of input data DI(0:4) is inputted to data lines L10, L11 to L14 (L01 to L04) of the first group. Then, of 25 CMOS type transfer gates, 5 COMS type transfer gates Tik in the longitudinal direction in FIG. 3 turn ON and the remaining 20 COMS type transfer gates turn OFF. Thereby, output data DO(0:4) obtained by shifting input data DI(0:4) rightward by k bits is outputted from data lines L20 to L24 of the second group.

Conversely, when the 5-bit input data DI(0:4) is shifted leftward by k (k=0 to 4) bits, control signals Sk, #Sk are made active (Sk="1", #Sk="0") and each bit of input data DI(0:4) is inputted to data lines L20 to L24 of the second group. Then, of 25 CMOS type transfer gates, 5 COMS type transfer gates Tik in the longitudinal direction in FIG. 3 turn ON and the remaining 20 COMS type transfer gates turn OFF. Thereby, output data DO(0:4) obtained by shifting input data DI(0:4) leftward by k bits is outputted from data lines L10, L11 to L14 (L01 to L04) of the first group.

Figure 4:
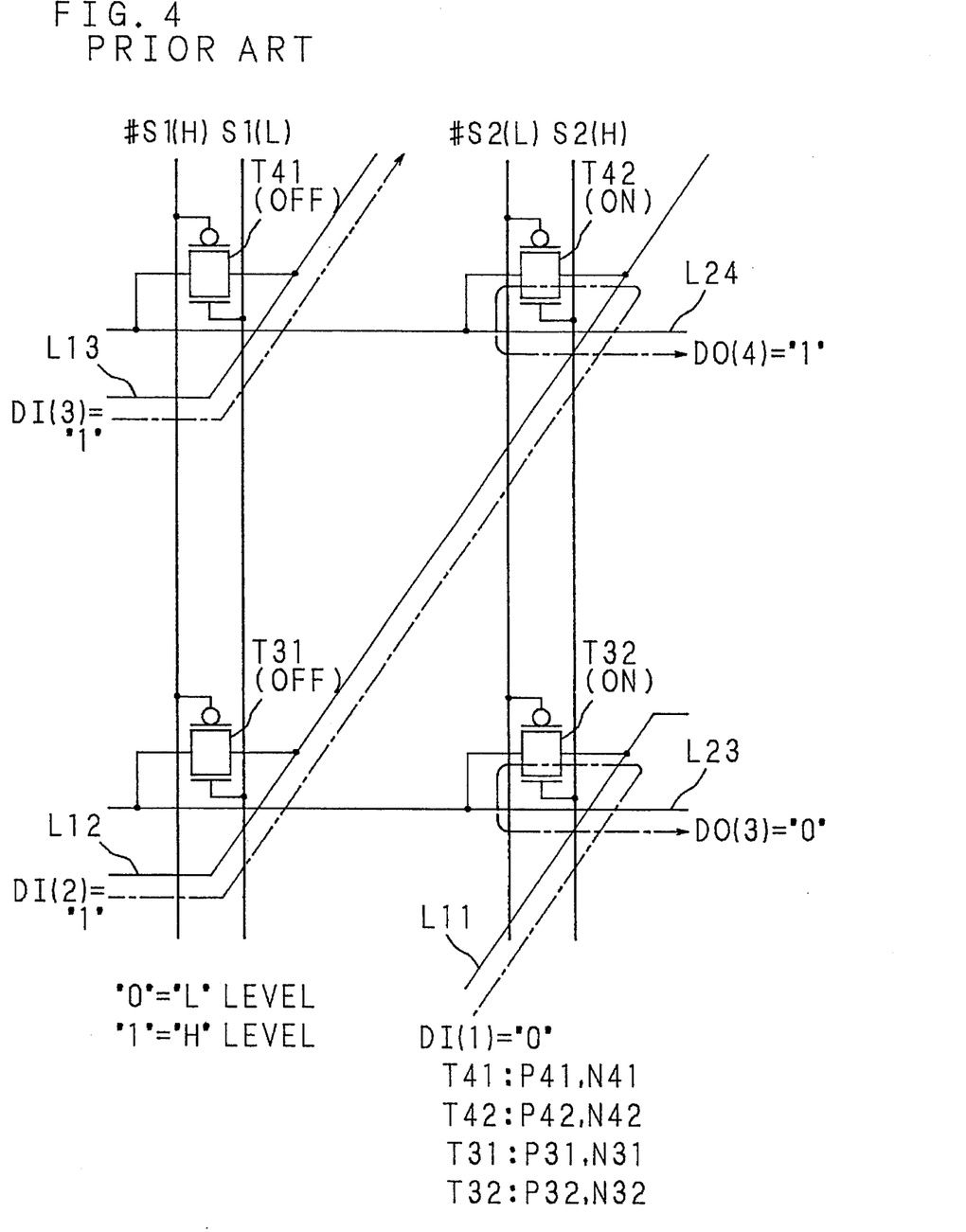
FIG. 4 is a logic circuit diagram which indicates a part of the logic construction of a barrel shifter having a CMOS structure to realize the truth table of FIG. 2.

Now, the barrel shifter having a CMOS structure will be described in detail hereinafter. FIG. 4 is a logic circuit diagram indicating part of logic configuration when the barrel shifter of 5×5 bit configuration shown in FIG. 3 as described above is configured with COMS transfer gates, while FIG. 5 is a schematic diagram showing the layout of the COMS type transfer gates on a chip.

In this embodiment, as one example, description will be made on the case when 5-bit input data DI(0:4) is designated by "0011" and is shifted rightward by 2 bits (hereinafter called "right 2-bit shift"). FIG. 4 and FIG. 5 show T31, T32, T41 and T42 of CMOS type transfer gates which configure the barrel shifter shown in FIG. 3.

Figure 5:
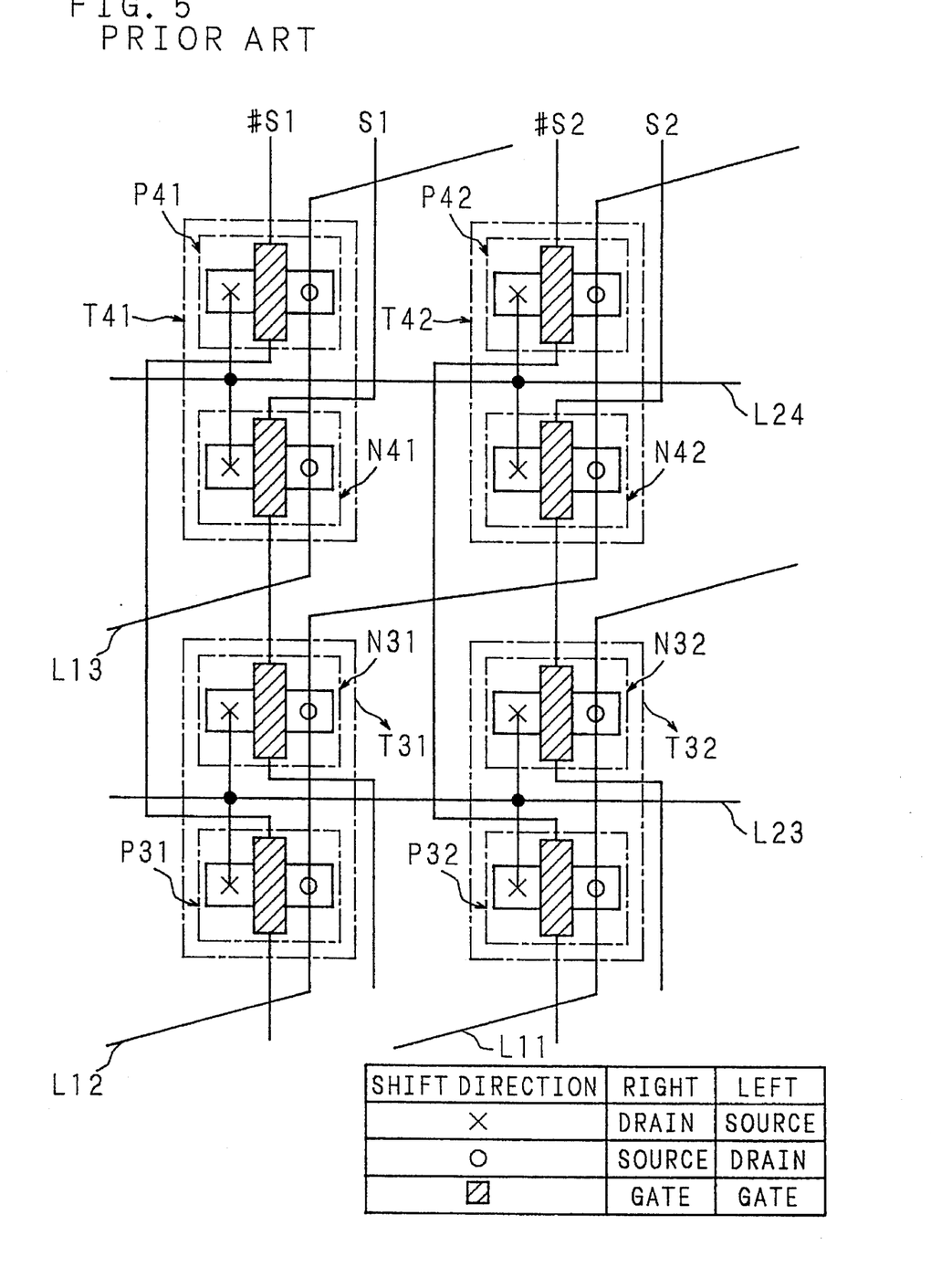
FIG. 5 is a schematic view indicating the layout of transfer gates to realize the logic circuit diagram of FIG. 4.

In the range shown in FIG. 5, for example, control signal S1 for N type transfer gates is connected to gates, that is, control terminals of N type transfer gates N31, N41 of CMOS type transfer gates T31, T41, while control signal #S2 for P type transfer gate is connected to gates, that is, control terminals of P type transfer gates P32, P42 of CMOS type transfer gates T32, T42.

Data line L12 of the first group is connected to controlled terminals, that is, sources or drains of P-type transfer gate P31 and N-type transfer gate N31 of CMOS type transfer gate T31, and N-type transfer gate N42 and P-type transfer gate P42 of CMOS type transfer gate T42. Data line L24 of the second group is connected to controlled terminals, that is, sources or drains of P-type transfer gate P41 and N-type transfer gate N41 of CMOS type transfer gate T41, and N-type transfer gate N42 and P-type transfer gate P42 of CMOS type transfer gate T42.

In FIG. 5, in case of right shift, that is, in the case where the input data is inputted from the data lines L10, L11 to L14 (L01 to L04) of the first group and the output data is outputted to the data lines L20 to L24 of the second group, the drain of each N-type and P-type transfer gate becomes "×" and the source "O" respectively. Conversely, in case of left shift, that is, in the case where when the input data is inputted from the data lines L20 to L24 of the second group and the output data is outputted to the data lines L10, L11 to L14 (L01 to L04) of the first group, the drain of each N-type and P-type transfer gate becomes "O" and the source "×" respectively.

In case of right 2-bit shift, as shown in FIG. 2, because S2 among the control signals S0 to S4 for N-type transfer gate and #S2 among the control signals #S0 to #S4 for P-type transfer gate become active (S2="1", #S2="0") in FIG. 4 and FIG. 5, CMOS type transfer gate T42 (composed of P-type transfer gate P42 and N-type transfer gate N42 in FIG. 5) for 2-bit shift connected to data line L24 of the second group and, in the same manner, CMOS type transfer gate T32 (composed of P-type transfer gate P32 and N-type transfer gate N32 in FIG.5) for 2-bit shift connected to data line L23, turn on.

And each bit of input data DI(0:4) is inputted to data the lines L10, L11 to L14 (L01 to L04) of the first group, but in the range shown in FIG. 5, input data DI(2) is inputted to the data line L12 and input data DI(3) to the data line L13, respectively. This causes the data "0" of DI(1) of the input data DI(0:4) to propagate to the data line L23 via the CMOS type transfer gate T32 from the data line L11, and in the same manner, the data "1" of DI(2) to the data line L24 via the CMOS type transfer gate T42 from the data line L12.

The circuit of CMOS structure described above as shown in FIG. 4 and FIG. 5, unlike the barrel shifter having a NMOS structure, requires no structure for loading the initial data and is operable from high frequency to clock stop condition. However, the CMOS structure, for example, CMOS type transfer gates T31, T32, T41, T42, etc. shown in FIG. 4 comprises both P-type and N-type transfer gates P31 and T31, P32 and T32, P41 and T41, and T42 and T42, etc., respectively, requiring a large layout area on the chip, increasing product costs. The layout area is further increased because the output capacity of the transfer gate for drain output data line is large and wiring of gate control signals for control of the number of shift bits is longer because it makes a detour around the transfer gate.

Under these circumstances, barrel shifters having a CMOS structure have not yet been put into practical use for industrial products. However, as described above, the CMOS structure circuit requires no circuit for loading the initial data and has such an ideal advantage of reducing electric consumption as that it is operable from high frequency to clock stop condition. This is extremely advantageous for so-called lap top type or palm top type microcomputers which operate primarily from a battery.

The object of the present invention is to provide a barrel shifter having a CMOS structure integrated on MOS integrated circuits, which solves the above-mentioned problems, requires a small layout area, and is capable of carrying out high-speed shift operation so as to put the barrel shifter having a CMOS structure into practical use while making the best use of its advantages of no need for a circuit for loading the initial data and capabilities to make static operation and to operate from high frequency to clock stop condition.

SUMMARY OF THE INVENTION

The barrel shifter having a CMOS structure according to the present invention comprises a plurality of CMOS type transfer gates, each consisting of P-type and N-type transfer gates and arranged in matrix, the input data line which inputs data of multiple bits to be shifted, the output data line which outputs multiple bit data after being shifted, and control lines which controls ON/OFF of multiple CMOS type transfer gates in conformity with the number of shift bits of the data, and is integrated on the MOS integrated circuit so that it shifts the data inputted from the input data line by the number of bits specified by the control line and outputs the data to the output data line, and in addition, is designed to have the common source/drain area of one P-type transfer gate of two adjacent CMOS type transfer gates connected to the common output data line (or input data line) in multiple CMOS type transfer gates, and similarly, to have the common source/drain area of two N-type transfer gates, and to have common wiring between the drain (or source) area and the common data output line.

The barrel shifter having a CMOS structure according to the present invention comprises a plurality of CMOS type transfer gates, each consisting of P-type transfer gates and N-type transfer gates and arranged in n×n matrix, the input data line which inputs the multiple bit data to be shifted, the output data line which outputs the multiple bit data after being shifted, and the control line which turns on the "k"th column (or "k"th row) in multiple CMOS type transfer gates corresponding to number of shift bits k of the data and turns off other CMOS type transfer gates, and is integrated on the MOS integrated circuit so that it shifts the data inputted from the input data line by number of bits k specified by the control line and outputs the data to the output data line, and in addition, is designed to have the common source/drain area of the P-type transfer gate on the "i"th column (or "i"th row) and P-type transfer gate on the "i+1"th column (or "i+1"th row) connected to the common output data line (or input data line) in multiple CMOS type transfer gates, and to have the common source/drain area of N-type transfer gate on the "i"th column (or "i"th row) and N-type transfer gate on the "i−1"th column (or "i−1"th row), and to have the common source/drain area of N-type transfer gate on the "i+1"th column (or "i+1"th row) and N-type transfer gate on the "i+2"th column (or "i+2"th row), and to have the connection point with the control signal of source/drain area for the N-type transfer gate and P-type transfer gate on the same column (or row) arranged linearly.

In the barrel shifter having a CMOS structure integrated on the MOS integrated circuit according to the present invention as described above, because the same line is used to connect the data line and the output-side source or drain of the adjacent CMOS type transfer gate in CMOS type transfer gates connected to common output data line, the output capacity of CMOS type transfer gate and wiring capacity of the data line are reduced and the layout area is reduced, and as a result, the required area on the chip is reduced.

The above and further objects and features of the invention will more fully be apparent from the following detailed description with accompanying drawings.

DESCRIPTION OF THE PREFERRED EMBODIMENTS

Referring now to the drawings, preferred embodiments according to the present invention will be described in detail hereinafter.

[Embodiment 1]

First of all, referring to FIG. 6, the first embodiment of a barrel shifter having a CMOS structure according to the present invention will be described.

Figure 6:
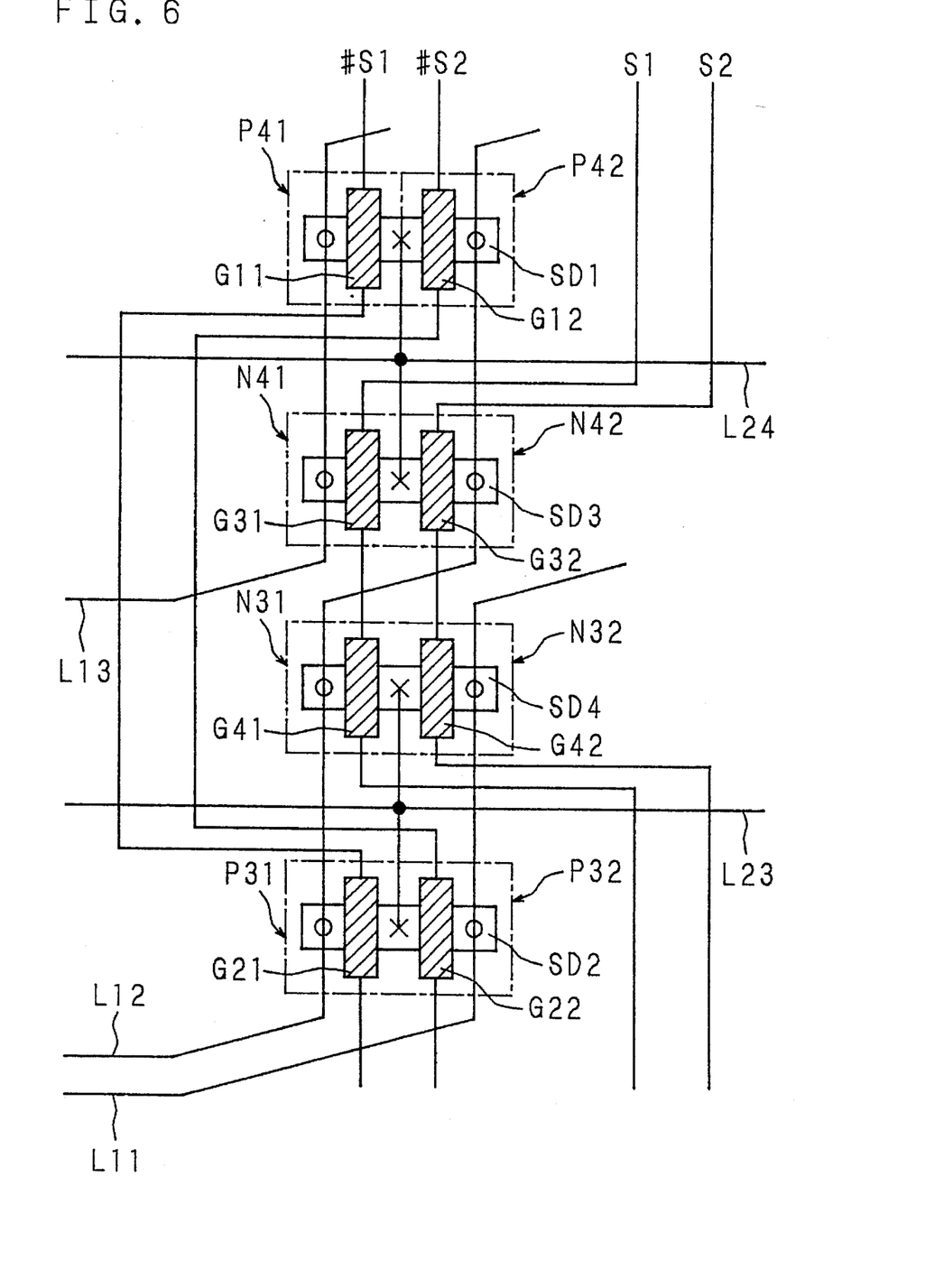
FIG. 6 is a schematic diagram showing the layout of transfer gates in one embodiment of a barrel shifter having a CMOS structure according to the present invention.

FIG. 6 is a schematic diagram showing the layout of transfer gates when the barrel shifter having a CMOS structure according to the present invention is integrated on the MOS integrated circuit of the first embodiment.

In the barrel shifter having a CMOS structure according to the present invention, the logic arrangement of the whole CMOS type transfer gates and wiring condition of each signal line are same as shown in FIG. 3, and FIG. 6 shows the portion corresponding to that shown in FIG. 5 which is referred to in the previous description. In FIG. 6, the same reference symbols indicate the same or equivalent portions shown in FIG. 5.

In FIG. 6, reference symbols L11, L12, L13 show part of data lines L10, L11 to L14 (L01 to L04) of the first group shown in FIG. 3 and reference symbols L23, L24 show part of data lines L20 to L24 of the second group shown in FIG. 3.

Reference symbol S1 shows the control line of N-type transfer gate for 1-bit shift, S2 the control line of N-type transfer gate for 2-bit shift, #S1 shows the control line of P-type transfer gate for 1-bit shift, and #S2 the control line Of P-type transfer gate for 2-bit shift, respectively.

Reference symbols P31, P32, P41, P42 show P-type transfer gates comprising CMOS type transfer gates T31, T32, T41, T42, respectively, and N31, N32, N41, N42 show N-type transfer gates, respectively.

However, in the embodiment shown in FIG. 6, for the structure on an actual chip, data line L10, L11 to L14 (L01 to L04) of the first group comprise the second metal layer, data line L20 to L24 the first metal layer, and shift bit number control line S0 to S4, #S0 to #S4 the polysilicon layer, indicating that they are stacked in layers on a chip by the one polysilicon-two metal process.

The layout of the barrel shifter having a CMOS structure according to the first embodiment of present invention is shown in FIG. 6. In the layout of the transfer gates integrated on the MOS integrated circuit, P-type transfer gates P41 and P42 of CMOS type transfer gates T41 and T42 adjoin each other as in FIG. 5, and as well as N-type transfer gates N41 and N42 formed integrally, respectively.

Specifically, the source/drain region of P-type transfer gates P41 and P42 is made common as shown with a white square assigned with reference symbol SD1 in FIG. 6 and as shown with the "X" mark at the center portion, the first controlled terminal (which functions as drain in case of right shift and as source in case of left shift) of the two is formed in common. The wiring connecting between the controlled terminal and the second group data line L24 is also made common.

As shown with the "O" mark, each of the second controlled terminals (which functions as source in case of right shift and as drain in case of left shift) is formed on both ends of shared source/drain region SD1 of P-type transfer gates P41 and P-42 and the data lines L13 and L12 of the first group pass through and are connected, respectively.

And in the region between both second controlled terminals ("O") and the first controlled terminals ("×") of the source/drain region SD1 of P-type transfer gates P41 and P42, gate regions G11 and G12 are formed as shown with a hatched square in FIG. 6. To the gate region G11, the control line #S1 of P-type transfer gate for 1-bit shift passes through and is connected, and to the gate region G12, the control line #S2 of P-type transfer gate for 2-bit shift passes through and is connected, respectively.

On the other hand, the source/drain region of P-type transfer gates P31 and P32 is made common as shown with a white square assigned with reference symbol SD2 in FIG. 6, and as shown with the "×" mark at the center portion common. The first controlled terminal (which functions as drain in case of right shift and as source in case of left shift) of the two is formed in common and at the same time, the wiring connecting between the controlled terminal and the second group data line L23 is also made common.

As shown with the "○" mark, each of the second controlled terminals (which functions as source in case of right shift and as drain in case of left shift) is formed on both ends of the shared source/drain region SD2 of P-type transfer gates P31 and P32 and the data lines L12 and L11 of the first group pass through and are connected, respectively.

And in the region between both second controlled terminals ("○") and the first controlled terminals ("×") of the source/drain region SD2 of P-type transfer gates P31 and P32, gate regions G21 and G22 are formed as shown with a hatched square in FIG. 6. The control line #S1 of P-type transfer gate for 1-bit shift passes through and is connected to gate region G21, and the control line #S2 of P-type transfer gate for 2-bit shift passes through and is connected to gate region G22 respectively.

Consequently, P-type transfer gate P41 consists of a half of the portion, to which the first group data line L13 is connected, of the source/drain region SD1 and the gate region G11, and P-type transfer gate P42 consists of a half of the portion, to which the first group data line L12 is connected, of the source/drain region SD1 and the gate region G12, respectively.

And P-type transfer gate P31 consists of a half of the portion, to which the first group data line L12 is connected, of the source/drain region SD2 and the gate region G21, and P-type transfer gate P32 consists of a half of the portion, to which the first group data line L11 is connected, of the source/drain region SD2 and the gate region G22, respectively.

Similarly, the source/drain region of N-type transfer gates N41 and N42 is made common as shown with a white square assigned with reference symbol SD3 in FIG. 6 and as shown with the "×" mark at the center portion, the first controlled terminal (which functions as drain in case of right shift and as source in case of left shift) of the two is formed in common. The wiring connecting between the controlled terminal and the second group data line L24 is also made common.

As shown with the "○" mark, each of the second controlled terminals (which functions as source in case of right shift and as drain in case of left shift) is formed on both ends of the shared source/drain region SD3 of N-type transfer gates N41 and N42 and the data lines L13 and L12 of the first group pass through and are connected, respectively.

And in the region between both second controlled terminals ("○") and the first controlled terminals ("×") of the source/drain region SD3 of N-type transfer gates N41 and N42, gate regions G31 and G32 are formed as shown with a hatched square in FIG. 6. The control line S1 of N-type transfer gate for 1-bit shift passes through and is connected to the gate region G31, and, the control line S2 of N-type transfer gate for 2-bit shift passes through and is connected to gate region G32, respectively.

On the other hand, the source/drain region of N-type transfer gates N31 and N32 is made common as shown with a white square assigned with reference symbol SD4 in FIG. 6, and as shown with the "×" mark at the center portion, the first controlled terminal (which functions as drain in case of right shift and as source in case of left shift) of the two is formed in common. The wiring connecting between the controlled terminal and the second group data line L23 is also made common.

As shown with the "○" mark, each of the second controlled terminals (which functions as source in case of right shift and as drain in case of left shift) is formed and at the same time the data lines L12 and L11 of the first group pass through and connected, respectively.

And in the region between both second controlled terminals ("○") and the first controlled terminals ("×") of the source/drain region SD4 of N-type transfer gates N31 and N32, gate regions G41 and G42 are formed as shown with a hatched square in FIG. 6. To the gate region G41, the control line S1 of N-type transfer gate for 1-bit shift passes through and is connected, to gate region G41, the control line S2 of N-type transfer gate for 2-bit shift passes through and is connected to gate region G42, respectively.

Consequently, N-type transfer gate N41 consists of a half of the portion, to which the first group data line L13 is connected, of the source/drain region SD3 and the gate region G31, and N-type transfer gate N42 consists of a half of the portion, to which the first group data line L12 is connected, of the source/drain region SD3 and the gate region G32, respectively.

And N-type transfer gate N31 consists of a half of the portion, to which the first group data line L12 is connected, of the source/drain region SD4 and the gate region G41, and N-type transfer gate N32 consists of a half of the portion, to which the first group data line L11 is connected, of the source/drain region SD4 and the gate region G42, respectively.

In FIG. 5, two adjoining CMOS type transfer gates T41 and T42 consist of a total of four blocks comprising independent P-type and N-type transfer gates P41, N41, P42, and N42, respectively, but in the first embodiment of the barrel shifter having a CMOS structure according to the present invention, the layout of the transfer gate of which is shown in FIG. 6, the transfer gate consists of a total of two blocks comprising one block in which the source/drain region of P-type transfer gates P41, P42 is made in common and one block in which the source/drain region of N-type transfer gates N41, N42 is made in common.

Adopting the layout as shown in FIG. 6, the occupied area on a chip of the barrel shifter having a CMOS structure according to the present invention can be reduced as a whole as compared with the barrel shifter having a CMOS structure shown in FIG. 5, and the output capacity from the first controlled terminal shown with "×" mark of each transfer gate can be reduced by a half, and at the same time the wiring capacity of data line also can be reduced.

[Embodiment 2]

In the above-mentioned embodiment shown in FIG. 6, the source or drain of the two pieces each of P-type transfer gate and N-type transfer gate comprising two CMOS type transfer gates are made common. For example, the source/drain region SD1 of P-type transfer gates P41 and P42 comprising COMS type transfer gates T41, T42 are made common and the source/drain region SD3 of N-type transfer gates N41 and N42 are made common.

However, in the configuration of the first embodiment shown in FIG. 6 which shows the layout of the transfer gates when the barrel shifter is integrated on the MOS integrated circuit, control lines #S1, #S2 of P-type transfer gate connecting the second controlled terminal ("○") of P-type transfer gates P41, P42 of CMOS type transfer gates T41, T42 and the second controlled terminal ("○") of P-type transfer gates P31, P32 of CMOS type transfer gates T31, T32 are wired by detouring each N-type transfer gate N41, N42, N31, N32. Similarly, the N-type transfer gate control lines S1, S2 which connect second controlled terminals ("○") of N-type transfer gates N41, N42, N31, N32 are wired by detouring each P-type transfer gate P41, P42, P31, P32.

As described above, in the first embodiment shown in FIG. 6, P-type transfer gate control lines #S1, #S2 are wired by detouring the N-type transfer gates, and N-type transfer gate control lines S1, S2 are wired by detouring the P-type transfer gates, requiring an additional layout area for the detours.

Figure 7:
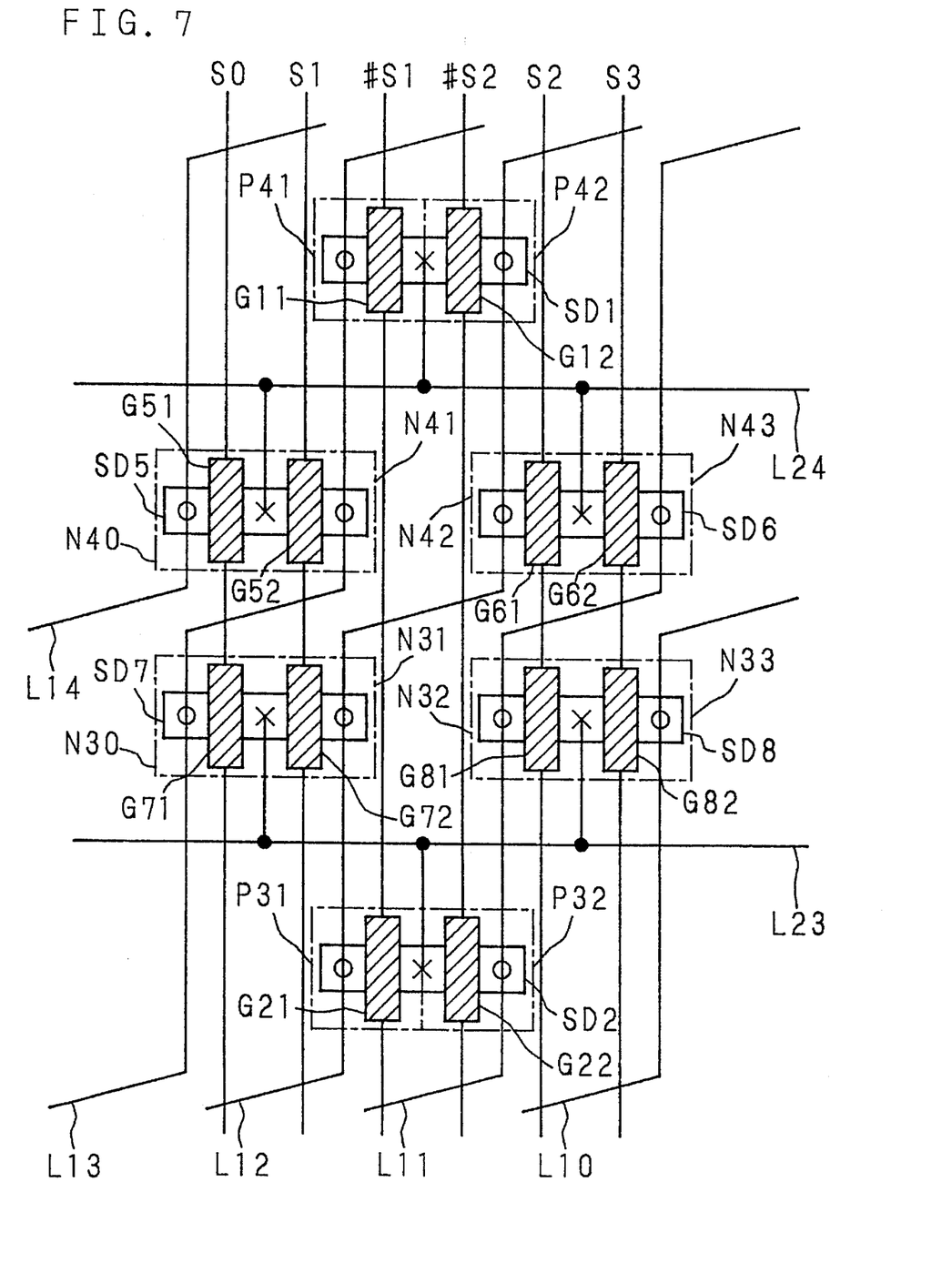
FIG. 7 is a schematic diagram showing a layout of transfer gates in other embodiment of a barrel shifter having a CMOS structure according to the present invention.

However, when P-type transfer gates and N-type transfer gates are designed to be assembled with 1 bit deviated, the layout area can be further reduced, achieving a more compact barrel shifter having a CMOS structure. FIG. 7 shows a schematic diagram showing the transfer gate layout when the barrel shifter having a CMOS structure according to the present invention with the structure described in the second embodiment is integrated on the MOS integrated circuit.

In FIG. 7, symbols same as those in FIG. 5 and FIG. 6 show the same or equivalent portions, and the description of them is omitted.

However, in the embodiment shown in FIG. 7, for the configuration on an actual chip, in the same manner as in FIG. 6, the first group data lines L10, L11 to L14 (L01 to L04) formed with the second metal layer, the second group data lines L20 to L24 with the first metal layer, and shift bit number control lines S0 to S4, #S0 to #S4 with the polysilicon layer are stacked on the chip by the so-called one polysilicon-two metal process.

The layout of the barrel shifter having a CMOS structure according to the second embodiment of the present invention is shown in FIG. 7. As in the first embodiment, the layout of which is shown in FIG. 6, P-type transfer gates P41 and P42 of CMOS type transfer gates T41 and T42 are formed integrally with the source/drain region made in common and P-type transfer gates P31 and P32 of CMOS type transfer gates T31 and T32 are formed integrally with the source/drain region made in common, respectively.

However, with respect to the N-type transfer gate, N-type transfer gates N40 and N41 of CMOS type transfer gates T40 and T41 as well as N-type transfer gates N42 and N43 of COMS type transfer gates T42 and T43 are formed integrally, respectively.

Specifically, P-type transfer gates P41 and P42 as well as P31 and P32 are formed in the same manner as in the first embodiment shown in FIG. 6.

That is, P-type transfer gate P41 consists of a half of the portion, to which the first group data line L13 is connected, of the source/drain region SD1 and the gate region G11, and P-type transfer gate P42 consists of a half of the portion, to which the first group data line L12 is connected, of the source/drain region SD1 and the gate region G12, respectively.

And P-type transfer gate P31 consists of a half of the portion, to which the first group data line L12 is connected, of the source/drain region SD2 and the gate region G21, and P-type transfer gate P32 consists of a half of the portion, to which the first group data line L11 is connected, of the source/drain region SD2 and the gate region G22, respectively.

However, N-type transfer gates are different from those in the first embodiment shown in FIG. 6.

The source/drain region of N-type transfer gates N40 and N41 is made common as shown with a white square assigned with reference symbol SD5 in FIG. 7, and as shown with the "✕" mark at the center portion, the first controlled terminal (which functions as drain in case of right shift and as source in case of left shift) of the two is formed in common. The wiring connecting the controlled terminal and the second group data line L24 is also made common.

As shown with the "○" mark, each of the second controlled terminals (which functions as source in case of right shift and as drain in case of left shift) is formed on both ends of the shared source/drain region SD5 of N-type transfer gates N40 and N41 and, the data lines L14 and L11 of the first group pass through and are connected, respectively.

And in the region between both second controlled terminals ("○") and the first controlled terminals ("✕") of the source/drain region SD5 of N-type transfer gates N40 and N41, gate regions G51 and G52 are formed as shown with a hatched square in FIG. 7. The line S0 of N-type transfer gate for 0-bit shift passes through and is connected to the gate region G51, the control line S1 of N-type transfer gate for 1-bit shift passes through and is connected to gate region G52, respectively.

On the other hand, the source/drain region of N-type transfer gates N30 and N31 is made common as shown with a white square assigned with reference symbol SD7 in FIG. 7 and as shown with the "✕" mark at the center portion, the first controlled terminal (which functions as drain in case of right shift and as source in case of left shift) of the two is formed in common. The connecting the controlled terminal and the second group data line L23 is also made common.

As shown with the "○" mark, each of the second controlled terminals (which functions as source in case of right shift and as drain in case of left shift) is formed on both ends of the shared source/drain region SD7 of N-type transfer gates N30 and N31 and at the same time, the data lines L13 and L12 of the first group pass through and connected, respectively.

And in the region between both second controlled terminals ("○") and the first controlled terminals ("✕") of the source/drain region SD7 of N-type transfer gates N30 and N31, gate regions G71 and G72 are formed as shown with a hatched square in FIG. 7. The control line S0 of N-type transfer gate for 0-bit shift passes through and is connected to gate region G71, and the control line S1 of N-type transfer gate for 1-bit shift passes through and is connected to gate region G72, respectively.

Consequently, N-type transfer gate N40 consists of a half of the portion, to which the first group data line L14 is connected, of the source/drain region SD5 and the gate region G51, and N-type transfer gate N41 consists of a half of the portion, to which the first group data line L13 is connected, of the source/drain region SD5 and the gate region G52, respectively.

And N-type transfer gate N30 consists of a half of the portion, to which the first group data line L13 is connected, of the source/drain region SD7 and the gate region G71, and N-type transfer gate N31 consists of a half of the portion, to which the first group data line L12 is connected, of the source/drain region SD7 and the gate region G72, respectively.

In the similar manner, N-type transfer gate N42 consists of a half of the portion, to which the first group data line L12 is connected, of the source/drain region SD6 and the gate region G61, and N-type transfer gate N43 consists of a half of the portion, to which the first group data line L11 is connected, of the source/drain region SD6 and the gate region G62, respectively.

And N-type transfer gate N32 consists of a half of the portion, to which the first group data line L11 is connected, of the source/drain region SD8 and the gate region G81, and N-type transfer gate N33 consists of a half of the portion, to which the first group data line L10 is connected, of the source/drain region SD8 and the gate region G82, respectively.

In FIG. 5, four adjoining CMOS type transfer gates T41 and T42 and T31 and T32 consist of a total of eight blocks comprising independent P-type and N-type transfer gates P41, N41, P42, N42, P31, N31, P32, and N32, respectively. However, in the first embodiment of the barrel shifter having a CMOS structure according to the present invention, the layout of the transfer gate of which is shown in FIG. 6, the transfer gate consists of a total of four blocks comprising two blocks in which the source/drain region of P-type transfer gates P41, P42, P31, P32 is made common, a half of block in which the source/drain region of N-type transfer gates N40, N41 is made in common, a half of block in which the source/drain region of N-type transfer gates N30, N31 is made in common, and a half of block in which the source/drain region of N-type transfer gates N32, N33 is made in common.

In the second embodiment, the layout of the transfer gate of which is shown in FIG. 7 as described above, in addition to the first embodiment shown in FIG. 6 as mentioned above, the shift bit number control line can be wired in one straight line, enabling reduction of wiring capacitance as well as reducing the layout area on a chip.

As described above in detail, according to the barrel shifter having a CMOS structure integrated on the MOS integrated circuit of the present invention, the layout area of the barrel shifter having a CMOS structure formed on a chip of the MOS integrated circuit can be reduced and the output capacity of the transfer gate can be reduced by a half.

In the second embodiment, the capability to wire control signals linearly can reduce the wiring capacitance and wiring resistance and achieves further higher speed operation.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A barrel shifter having a CMOS structure integrated on a MOS integrated circuit for shifting plural-bit data towards the least significant bit (right shift) or towards the most significant bit (left shift), comprising:

a plurality of CMOS type transfer gates, each consisting of a P-type transfer gate and an N-type transfer gate, and arranged in a matrix;

input data lines for inputting the plural-bit data to be shifted;

output data lines for outputting the shifted plural-bit data;

control lines for controlling ON/OFF operation of said plurality of CMOS type transfer gates in accordance with logic signal levels thereon, corresponding to a number of bits to be shifted, the ON/OFF operation of said plurality of CMOS type transfer gates being controlled so that data inputted on said input data lines is shifted in accordance with the number of bits to be shifted and the shifted data is outputted on the output data lines, wherein in two adjoining CMOS transfer gates, two of the P-type transfer gates connected to a same data line which functions as an output data line or input data line according to setting of function mode have a common region of field as source or drain, common source/drain contacts, and a common wiring line to said data line, and in two adjoining CMOS transfer gates, two of the N-type transfer gates connected to a same data line which functions as an output data line or input data line according to setting of function mode have a common region of field as source or drain, common source/drain contacts, and a common wiring line to said data line.

2. A barrel shifter having a CMOS structure integrated on a MOS integrated circuit for shifting plural-bit data towards the least significant bit (right shift) or towards the most significant bit (left shift), comprising:

a plurality of CMOS type transfer gates, each consisting of a P-type transfer gate and an N-type transfer gate, and arranged in an n×n matrix;

input data lines for inputting the plural-bit data to be shifted;

output data lines for outputting the shifted plural-bit data;

control lines for turning the CMOS type transfer gates of a "k"th column (or "k"th row) in said plurality of CMOS type transfer gates to an ON condition in accordance with logic signal levels thereon, corresponding to a number of bits "k" to be shifted, and turning other CMOS type transfer gates to an OFF condition, the ON/OFF condition of the CMOS type transfer gates shifting data inputted on said input data lines a number of bits corresponding to the number of bits "k" to be shifted and outputting the shifted data to the output data lines, wherein a P-type transfer gate on an "i"th column (or "i"th row) and a P-type transfer gate on an "i+1"th column (or "i+1"th row) connected to a common output data line which functions as an output data line and input data line according to setting of function mode (right shift or left shift) have a common region of field as source or drain, an N-type transfer gate on an "i"th column (or "i"th row) and a N-type transfer gate on an "i−1"th column (or "i−1"th row) have a common source/drain region, a N-type transfer gate on an "i+1"th column (or "i+1"th row) and a N-type transfer gate on an "i+2"th column (or "i+2"th row) have a common source/drain region, and the control signal lines for turning the P-type transfer gates and N-type transfer gates on the same column (or row) to the respective ON/OFF condition are linearly arranged.

* * * * *